(12) United States Patent
Solvi et al.

(10) Patent No.: US 9,371,571 B2
(45) Date of Patent: *Jun. 21, 2016

(54) GRANULATION OF METALLURGICAL SLAG

(75) Inventors: Marc Solvi, Ehlange (LU); Bob Greiveldinger, Frisange (LU); Mathias Hoffmann, Hesperange (LU); Claudine Friederici, Mamer (LU); Daniel Michels, Mersch (LU)

(73) Assignee: PAUL WURTH S.A., Luxembourg (LU)

( * ) Notice: Subject to any disclaimer, the term of this patent is extended or adjusted under 35 U.S.C. 154(b) by 372 days.

This patent is subject to a terminal disclaimer.

(21) Appl. No.: 13/994,807

(22) PCT Filed: Dec. 14, 2011

(86) PCT No.: PCT/EP2011/072811
§ 371 (c)(1),
(2), (4) Date: Jun. 17, 2013

(87) PCT Pub. No.: WO2012/080364
PCT Pub. Date: Jun. 21, 2012

(65) Prior Publication Data
US 2013/0292878 A1 Nov. 7, 2013

(30) Foreign Application Priority Data
Dec. 15, 2010 (LU) .......................................... 91766

(51) Int. Cl.
*B02C 19/00* (2006.01)
*C21B 3/06* (2006.01)
(Continued)

(52) U.S. Cl.
CPC ............... *C21B 3/06* (2013.01); *B02C 19/0056* (2013.01); *C04B 5/00* (2013.01); *C22B 7/04* (2013.01); *Y02P 10/212* (2015.11); *Y02W 30/543* (2015.05)

(58) Field of Classification Search
CPC ............ C22B 1/24; C22B 7/005; C22B 7/04; B02C 19/00; B02C 19/0056; C04B 5/06; C04B 5/00; C04B 18/141; C21B 3/06; C21B 3/08; F27B 21/06; F27D 15/0266; F27D 17/004; Y02W 30/94; Y02W 30/54; Y02W 30/543
USPC ............................................................ 241/3
See application file for complete search history.

(56) References Cited

U.S. PATENT DOCUMENTS

| 4,359,434 A | 11/1982 | Tiberg |
| 2013/0206875 A1* | 8/2013 | Solvi .......................... C04B 5/06 241/3 |

FOREIGN PATENT DOCUMENTS

| CN | 1097469 | 1/1995 |
| CN | 2420289 | 2/2001 |

(Continued)

OTHER PUBLICATIONS

Chinese Office Action for corresponding application No. 201180060869X; Report dated Mar. 26, 2014.
(Continued)

*Primary Examiner* — Mark Rosenbaum
(74) *Attorney, Agent, or Firm* — Cantor Colburn LLP

(57) ABSTRACT

A process for granulation of hot liquid slag wherein the hot liquid slag is mixed with solid metallic particles so as to form a solidified, vitrified slag cake mixed with said metallic particles and said slag cake is discharged in a water bath.

20 Claims, 2 Drawing Sheets

(51) Int. Cl.
*C04B 5/00* (2006.01)
*C22B 7/04* (2006.01)

(56) References Cited

FOREIGN PATENT DOCUMENTS

| | | |
|---|---|---|
| CN | 2614213 | 5/2004 |
| CN | 201106053 | 8/2008 |
| CN | 101545018 A | 9/2009 |
| EP | 0573769 A1 | 12/1993 |
| EP | 1422299 A1 | 5/2004 |
| GB | 821741 | 10/1959 |
| JP | S468789 | 6/1979 |
| JP | 2002308655 A | 10/2002 |
| LU | 79466 | 5/1979 |
| LU | 84642 | 11/1984 |
| LU | 84644 | 11/1984 |
| LU | 88380 | 7/1993 |
| LU | 88441 | 7/1995 |
| LU | 91424 A1 | 10/2009 |

OTHER PUBLICATIONS

International Preliminary Report on Patentability for corresponding application No. PCT/EP2011/072811 filed Dec. 14, 2011; Report Date Feb. 28, 2013.

International Search Report for corresponding application No. PCT/EP2011/072811 filed Dec. 14, 2011; Mail date May 4, 2012.

\* cited by examiner

GRANULATION OF METALLURGICAL SLAG

TECHNICAL FIELD

The present invention generally relates to granulation of slag from the metal industry and more particularly from the iron industry.

BACKGROUND ART

Conventionally, metallurgical slag is granulated in water.

Water quenching ensures fast solidification of the metallurgical slag, which, in the case of blast furnace slag, is a necessary condition for obtaining a valuable product. A water jet is firstly used to fragmentize the hot liquid slag stream into very small particles and to transfer them into a water bath. The energy form the hot slag is withdrawn through direct contact between the hot liquid slag and the water. As this has to happen at ambient pressure, the temperature of the slag is immediately lowered to a temperature level of below 100° C.

During the water granulation process, the sulfur contained in the hot liquid slag reacts with the water and generates sulfur dioxide ($SO_2$) and hydrogen sulfide ($H_2S$). The quantity of these toxic and malodorous gases is mainly dependent on the chemical composition of the slag and the granulation parameters.

The concentrations of both sulfur dioxide and hydrogen sulfide may be too high with regard to the environmental legislation so that measures have to be taken to lower these emissions to an acceptable concentration.

In the state of the art (see e.g. EPO 573 769, LU 88 441 and/or LU 91 424, from Paul Wurth S.A.) a condensation tower is erected above the granulation area. In the condensation tower, both $SO_2$ and $H_2S$ are condensed with the water vapor and hence recombined with the water to form sulfuric acid ($H_2SO_4$). The water is pumped into a cooling tower in which, due to contact with the ambient air under turbulent conditions, sulfur is partially transferred from the hot process water to the cooling air. Due to the large amount of cooling air, however, only small concentrations of $SO_2$ and $H_2S$ (below 1 mg/$Nm^3$) are measured.

JP2002308655 discloses a method to mix hot liquid slag with iron-containing fine powder to adjust and control the density of the slag. The addition of oxidized iron powder decreases the nitrogenated particles trapped in the molten slag and thus allows to obtain a high density slag independent of the tapping temperature of the slag.

CN 101 545 018 A describes a process and a device wherein the ladle slag first enters the drum slag area from the funnel. There are steel balls in the slag area, and as the drum turns, the slag is cooled by the steel balls. The heat of the molten steel and the slag is quickly removed by the steel balls, and the slag is plasticized. After solidification, it is carried by the rolling steel balls into the water cooling area. The slag and the steel balls are simultaneously cooled by the water. Then it is carried to the outer drum body through the drum's lattice-like grate bars, and the slag is cooled once again by the water in the outer drum and finally discharged. During this process, due to the effect of the fast rolling of the steel balls, the slag and steel are separated. The amount of cooling water is 1.25 T to 2 T per ton of slag. The steel ball rolling speed is 0.5 m/s to 2 m/s. The speed of the rolling balls makes sure the steel balls are not enveloped in the cooling molten steel. A suitable steel ball rolling speed guarantees that the granulation of the slag and the separation of the molten steel. It prevents lumping in the cooling process.

BRIEF SUMMARY

The invention provides a method of granulation of hot liquid slag, which minimizes the formation of sulfurous emissions during the granulation of hot liquid slag.

The invention proposes a process for granulation of hot liquid slag wherein the hot liquid slag is mixed with metallic particles so as to form a solidified, vitrified slag cake mixed with said metallic particles and wherein said slag cake mixed with said metallic particles is discharged in a water bath for further cooling, the hot liquid slag is poured first into a mold and then the solid metallic particles are poured into the mold containing the hot liquid slag. The hot liquid slag and the solid metallic particles are mixed so as to form a solidified, vitrified slag cake with the solid metallic particles entrapped therein.

The advantage of using discrete, solid, inert, metallic particles submerged into the liquid slag is that the heat transfer is very efficient and quick so that the slag is cooled rapidly and vitrifies completely to form a slag cake comprising solid metallic particles. The metallic particles are thus entrapped in the slag cake.

It has been found that during the traditional water or wet granulation where the hot liquid slag is brought into contact at about 1500° C. with water (below 100° C.) and fragmented by a water jet into small slag particles, a vapor layer is formed between each slag particle and the surrounding water due to the high temperature difference between these substances. This phenomenon is known as "Leidenfrost effect", in which a liquid, in near contact with a mass significantly hotter than the liquid's boiling point, produces an insulating vapor layer, which slows down the cooling process of the slag particles considerably.

It has been found that the sulfurous emissions are mostly formed through disintegration of sulfides (CaS, FeS, MnS) in the vapor layer between a slag particle and the liquid water.

This effect is minimized by the process according to the present invention in two ways:

1. The temperature of the slag in the present process is much lower than in the traditional water granulation (about 700° C. vs about 1500° C.) when it comes in contact with the water. The period of time where the Leidenfrost effect can take place is thus much shorter and therefore the quantity of sulfurous compounds formed is much lower.

2. The slag is already fully vitrified i.e. solidified when it comes in contact with the water. The water thus does not break the slag into small particles of about 1 mm as in the traditional water granulation, where a stream of hot liquid slag is disrupted by the impact of a water jet at high speed. As a consequence, the available surface per kg of slag where the Leidenfrost effect can take place and where sulfurous compounds can pass into the vapor phase is much smaller.

The combination of these two effects reduces the quantity of sulfurous compounds generated during the granulation process greatly.

When reference is made in the context of the present document to a dimension of a piece of slag cake this is understood to mean the diameter of the sphere that has same weight as a given particle.

A further advantage of the present invention is that the metallic particles are easily separated from the slag after cooling and may be reused in the process.

Additionally, as the metal particles are inert and do not react chemically with the slag, the chemical composition of the slag is not affected.

According to a preferred embodiment, the mold is first filled up to preferably about one third of its height with liquid slag and then the solid metallic particles are introduced into the mold.

The mold in which the hot liquid slag and the solid metallic particles are poured is preferably integrated in a troughed belt conveyor.

According to a preferred embodiment, the volume of slag in each mold is measured and the quantity of solid metallic particles is adapted to the volume of hot liquid slag in the mold so as to obtain an efficient and quick solidification and vitrification of the slag.

The solid metallic particles are preferably dropped from a height of about 1 to 3 m to obtain a quick and efficient mixing of the slag and the solid metallic particles. The exact height i.e. the exact amount of energy required for the particles to penetrate the liquid slag to the desired depth depends on the composition of the slag, the temperature of the slag, the density and the diameter of the solid metallic particles etc.

In order to obtain a good distribution of the solid metallic particles in the slag cake, the solid metallic particles are preferably distributed over the mold by a vibrating chute, a static device with fixed metal rods or a similar distributing device.

The slag cake containing the solid metallic particles is preferably broken down to pieces of slag cake of less than about 150 mm, preferably of less than about 100 mm, more preferably of less than about 80 mm and most preferably of less than about 50 mm before being discharged in the water bath.

The reduction of the size of the pieces of slag cake containing the solid metallic particles may be achieved by discharging the slag cake from the molds and dropping the pieces of slag cake containing the solid metallic particles onto an impact plate from a certain height. This impact plate may be situated at an angle of about 20 to 30° with regard to the horizontal. The impact point of the pieces of slag cake on the impact plate should preferably situated at about 3 m to about 6 m below the discharging point of the slag cake from the mold.

These pieces of slag cake then fall onto a cold runner situated below the impact plate. The slag pieces are further cooled and washed away by a powerful water jet. This water jet may be provided by an ordinary Paul Wurth SA granulation head (such as described in e.g. LU 88 380 and/or EP1 422 299). These granulation heads may deliver a water jet with about 1000 m³/h water mass flow. The pieces of slag taken up by the water jet emitted from the granulation head are hurled against a second impact plate situated at a certain distance from the end of the cold runner and then fall in a water bath situated below the cold runner.

The solid metallic particles advantageously have a density of at least 2.5 g/cm³. Due to the difference of densities between the slag and the metallic particles, the metallic particles and the slag mix thoroughly.

The solid metallic particles are preferably spherical so as to have good mixing properties and to assure a rapid and efficient cooling of the slag.

The solid metallic particles preferably have a diameter of at least 5 mm preferably more than 8 mm, more preferably more than 10 mm and most preferably more than 15 mm.

The solid metallic particles advantageously have a diameter of less than 30 mm, preferably less than 25 mm, more preferably less than 22 mm and most preferably less than 20 mm.

The solid metallic particles are preferably made of a metal chosen amongst the group consisting of iron, steel, aluminum, copper, chrome, their alloys, as well as their alloys with other metals.

In practice, it is preferred to use solid steel balls because they are readily available in different diameters and because they may be easily separated form the slag once it is cooled by e.g. by a magnet.

It was shown that in particular steel balls are suitable as solid, metallic particles and readily available. Surprisingly, it was found that dropping the solid metallic particles from a certain height gives them enough kinetic energy to penetrate into the liquid slag and to be distributed evenly throughout the height of the slag cake which is formed.

The amount of kinetic energy needed to achieve a uniform distribution of the solid metallic particles throughout the hot liquid slag depends on the viscosity of the slag, the nature of the particles and their density as well as on their diameter.

BRIEF DESCRIPTION OF THE DRAWINGS

A preferred embodiment of the invention will now be described, by way of example, with reference to the accompanying drawing in which.

DESCRIPTION OF PREFERRED EMBODIMENTS

Figure 1:
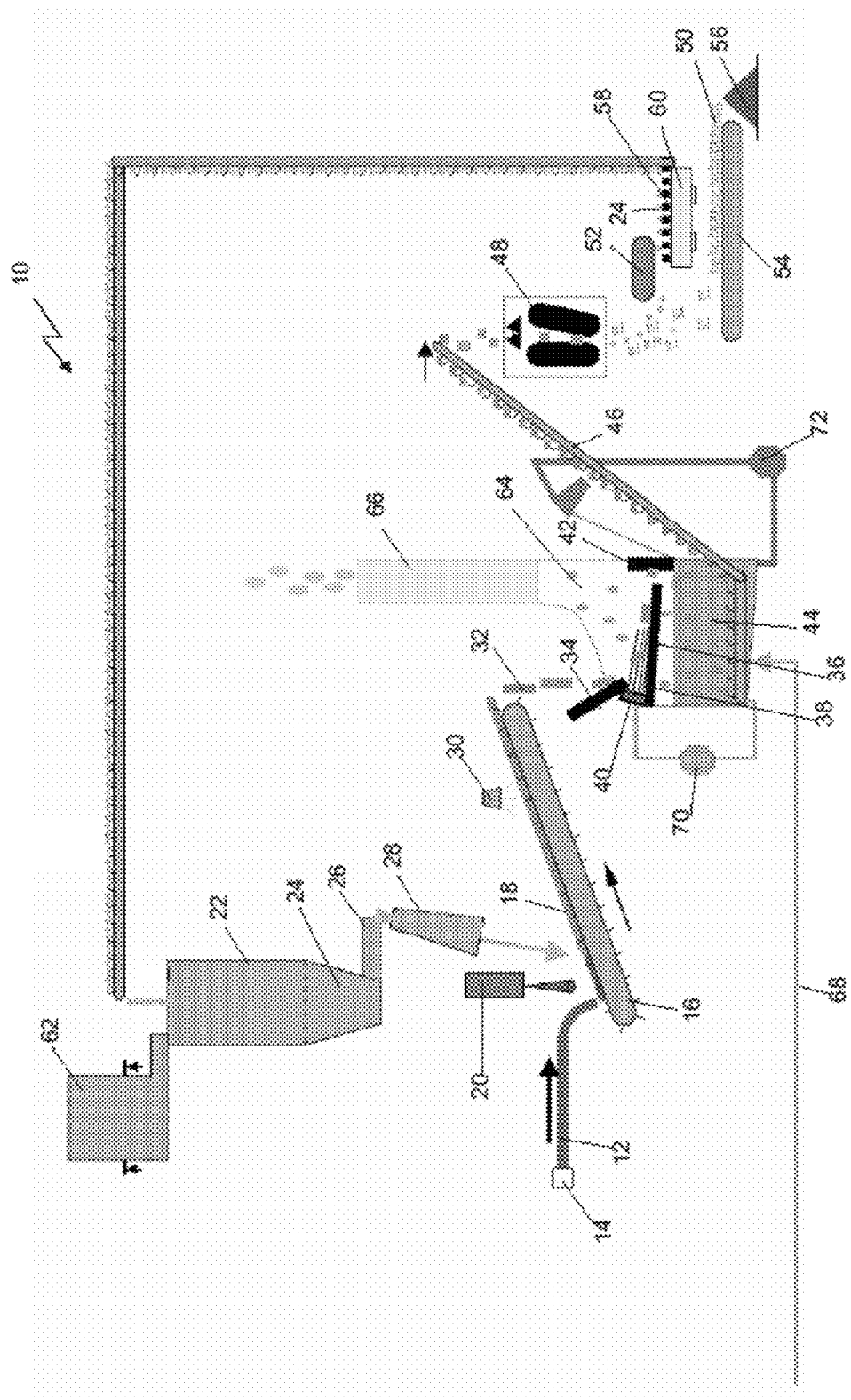
FIG. 1 is a flow sheet of a preferred embodiment of the process according to the invention.

FIG. 1 shows a schematic view of a preferred embodiment of granulation installation of hot liquid slag (e.g. from a blast furnace).

Figure 2:
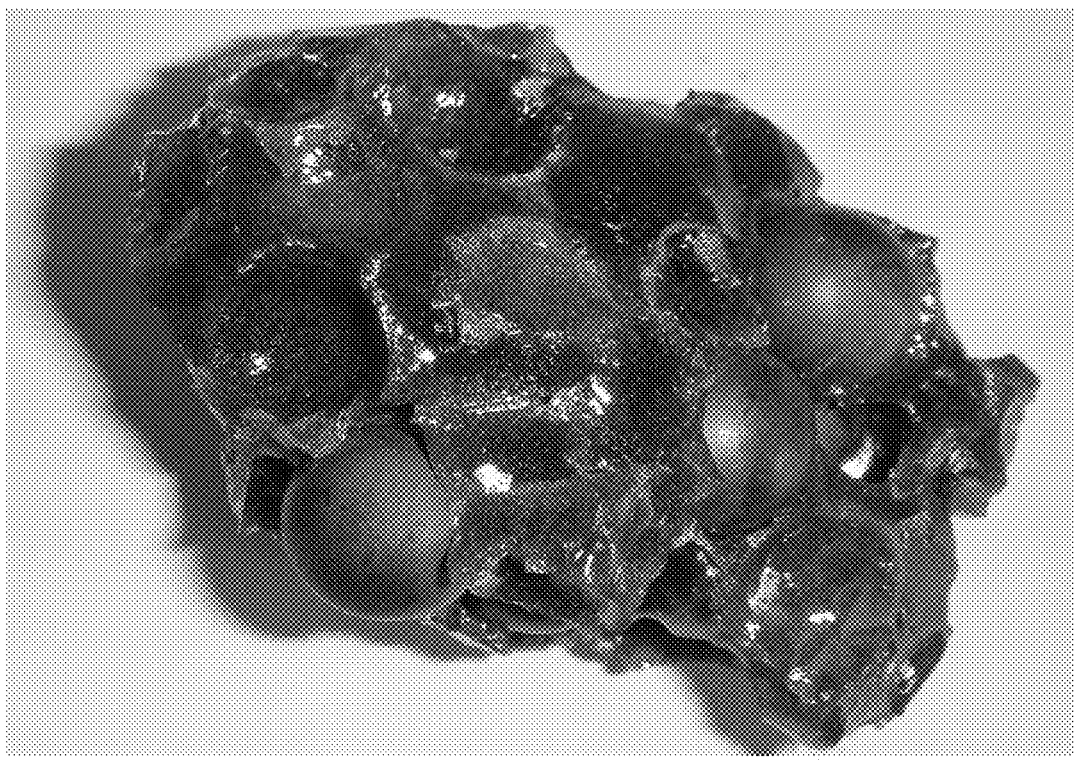
FIG. 2 shows a picture of a slag lump comprising steel balls.

FIG. 2 shows a picture of a piece of slag cake with steel balls.

FIG. 1 shows a schematic view of a preferred embodiment of granulation installation 10 of hot liquid slag (e.g. from a blast furnace). Hot liquid slag 12 at a temperature of about 1500° C. having a density of about 2.7 g/cm³ is transported in a slag runner 14 or in a slag ladle (not shown) at a flow rate of about 0.5 to about 6 t/min. The hot liquid slag 12 is poured onto a slag caster 16 comprising molds or troughs 18 which may be refractory lined. The slag caster 16 may be a trough conveyor belt.

The dimensions of the slag caster 16 are chosen to cope with the expected slag mass flow rates from a blast furnace (not shown). After the hot liquid slag 12 has been poured into a mold 18 of the slag caster 16, a level measurement by a radar probe 20 indicates the height of the slag layer in the mold 18 so as to be able to adapt the mass of solid metallic particles—in this particular example steel balls are used—to be added to that particular mold 18. The slag height inside the mold 18 does normally not exceed about one third of the height of the mold. The height can be adapted depending on the properties of the hot liquid slag 12 (temperature, viscosity, chemical composition etc.) and on other on-site circumstances. The mass ratio between steel balls and the hot liquid slag 12 is chosen so as to achieve the desired temperature in the mixture. The exact mass ratio thus depends on the temperature of the hot liquid slag 12 and the temperature of the steel balls, as well as on the density and thermal capacity of the slag. For hot liquid slag 12 at 1500° C. and steel balls at 30° C., the necessary mass ratio (steel balls/hot liquid slag) would be around 2.4 while the corresponding volume ratio would be around 0.8 The steel/slag mass ratio of 2.4 ensures an equilibrium temperature of the formed slag/steel cake of about 700° C. (with a slag temperature of 1500° C. and a steel sphere temperature of 30° C.). The densities as well as the heat capacities of steel and slag have been taken into account for this calculation. With the given densities, the mass ratio of 2.4 gives a volume ratio of 0.83 (steel/slag).

Each mold 18 of the slag caster is first filled with hot liquid slag 12 and then advances under a first buffer hopper 22 to be filled with steel balls 24, which are dropped into each mold 18. The steel balls 24 are dropped into the mold 18 from a height of about 2 m to obtain a quick and efficient mixing of the hot liquid slag 12 and the steel balls 24.

The steel balls 24 are stocked in a first buffer hopper 22 situated above the slag caster 16 and are extracted using a speed controllable screw conveyor 26 or a speed controllable vibrating chute. The steel balls 24 are distributed evenly over the whole surface of the mold 18 onto which they are to be dropped using a vibrating chute 28 or a static distribution device. The exact size of the steel balls 24 is depending on the properties of the slag and other specific conditions at the granulation site; however a medium diameter of about 10-25 mm may be suitable under most conditions.

A water sprayer 30 installed above the molds 18 of the slag caster 16 may be used to further cool the slag cake if necessary or in case of an emergency.

The mixture of slag and steel balls will rapidly solidify and form a solidified, vitrified slag cake 30 (in less then 10-20 s) and reach an equilibrium temperature of about 700° C. Due to the good thermal conductivity and the even distribution of the steel balls 24 in the slag, the slag cake 32 will be completely vitrified before being dropped out of the molds 18. Very little to no sulfur emissions at all are expected up to this point.

After reaching the equilibrium temperature, the slag cake 32 needs to be cooled further in order to allow an easy separation of the slag particles and the steel balls. The slag cake 32 may be dropped directly into the water bath. In the embodiment depicted on FIG. 1 the slag cake is however first dropped out of the molds 18 onto a first impact plate 34 where the slag cake 32 is broken into smaller pieces. These pieces of slag cake then fall onto a cold runner 36 situated below the impact plate 34. Here, the pieces of slag cake 32 are further cooled and washed away by a powerful water jet 38. This water jet 38 may be provided by an ordinary Paul Wurth SA granulation head 40 (such as described in e.g. LU 88 380 and/or EP1 422 299) with about 1000 m³/h water mass flow. The pieces of slag cake 32 taken up by the stream of water emitted from the granulation head 40 are hurled against a second impact plate 42 situated at the certain distance of end of the cold runner 36 and then fall in a water bath 44 situated below the cold runner 36 and the second impact plate 42.

In the preferred embodiment represented on FIG. 1, the slag cake 32 leaves the molds 18 in pieces having an average size of about 800 mm, the impact on the first impact plate 34 reduces the size of the pieces of slag cake 34 to about 150 mm and the water jet 38 with subsequent impact at the second impact plate 42 at the end of the cold runner 42 further reduces the pieces of slag cake 32 to about 20-30 mm.

The pieces of slag cake 32 are finally discharged of the water bath 44 using a belt conveyor 46. This belt conveyor 46 also assumes the role of dewatering unit for the pieces of slag cake 32. Given the rather large size of the pieces of slag cake 32 and their low porosity as compared to the slag particles obtained by traditional wet granulation systems, an efficient dewatering on the belt conveyor 46 is achieved. Hence, no additional dewatering units such as dewatering bins or INBA drums (such as described in e.g. LU 84 644, LU 84 642, and/or LU 79 466) will be necessary.

The pieces of slag cake 32, having a medium size of about 20-30 mm are then fed to a crusher 48 where the pieces of slag cake 32 containing the steel balls 24 are crushed so as to form on the one hand slag particles 50 and liberate the steel balls 24 contained in the slag cake 32 and thus insure that an efficient separation of the steel balls 24 from the slag particles 50 with a magnetic conveyor 52 is achieved.

After the separation of the steel balls 24 from the slag particles 50, the slag particles 50 are conveyed by a belt conveyor 54 to a storage area 56, whereas the steel balls 24 are recirculated to the first buffer hopper 22.

A screen 58 may be used to eliminate worn or damaged steel balls and to drop them in a box 60 situated underneath the screen 58. The eliminated steel balls are replaced with new steel balls and fed from a second hopper 60 to the first buffer hopper 22.

The cooling of the pieces of solidified vitrified slag cake 32 takes place through boiling heat transfer and the created water vapor 64 is released through a stack 66 situated above the water bath 44.

A conduct 68 provides make-up water to the water bath 44 to compensate for the evaporated water.

A booster pump 70 delivers the process water to the granulation head 40 to produce the water jet 38. The temperature of the water bath 44 will be around 100° C.

A recirculation pump 72 assures efficient extraction of any fines that may settle at the bottom of the water bath 44

The present process efficiently reduces the sulfur emissions to the environment while granulating hot liquid slag.

Indeed, in addition to the above arguments, the average blast furnace slag particle obtained a traditional wet granulation method may be assumed to have a diameter of approximately 1 mm. In the method described herein, the pieces of slag cake have an average size of 150 mm before hitting the water jet and approximately 20-30 mm when falling in the water bath. Accordingly, in this preferred embodiment, the available slag surface for creation of sulfurous emissions is reduced by a factor of 20-30.

As seen in FIG. 2 representing a picture of a piece of slag cake 32 comprising steel balls 24 obtained according to the process described herein, the pieces of slag cake are very compact and have few pores. The total surface of slag available for the above-described chemical reactions is further reduced. Moreover, the presence of steel balls yet further diminishes the exposed slag surface.

Finally, the reactions leading to the creation of sulfurous emissions can only take place at temperatures exceeding 400° C., this being due to thermal reasons. Indeed, the chemical equations for the creation of $SO_2$ and $H_2S$ can be summarized as follows:

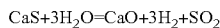

$$CaS + 3H_2O = CaO + 3H_2 + SO_2$$

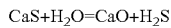

$$CaS + H_2O = CaO + H_2S$$

Below 400° C., the equilibrium of these reactions is strongly on the left side, so that below that temperature there is basically no liberation of sulfur from the slag particles.

Accordingly, sulfur will remain trapped inside the pieces of slag cake once this temperature of about 400° C. is reached. In traditional wet granulation systems, the slag has to be cooled with water from about 1500° C. whereas in the granulation according to this invention the pieces of slag cake only need to be cooled with water from a temperature of about 700° C. Calculations made by the applicant show that the required cooling time for the slag surface (depending on the size of the pieces of slag cake) to reach 400° C. starting at 700° C. is about half the time needed to reach those 400° C. when starting at 1500° C. The time frame in which sulfurous emissions may be formed is thus drastically reduced.

Taking into consideration all of the above assumptions, the expected sulfurous emissions of the present process amount only to about 1-5% of the generated emissions during classic wet granulation. As a consequence, compliance with even the most stringent environmental protection laws like the German TA Luft may be achieved without condensation of the vapors emitted during the granulation and without the need of a cooling tower. Instead, only make-up water for the evaporated sulfur-free steam is necessary to allow for continuous and low maintenance operation.

The invention claimed is:

1. A process for granulation of hot liquid slag wherein said hot liquid slag is mixed with solid metallic particles so as to form a solidified, vitrified slag cake mixed with the metallic particles and the slag cake mixed with the metallic particles is discharged in a water bath, wherein the hot liquid slag is poured first into a mold and subsequently the solid metallic particles are poured into the mold containing the hot liquid slag and mixed with the solid metallic particles so as to form the solidified, vitrified slag cake and wherein the slag cake is broken down into a plurality of pieces of slag cake.

2. The process for granulation of hot liquid slag according to claim 1, wherein the mold is filled up to about one third with hot liquid slag before the solid metallic particles are added to the mold.

3. The process for granulation of hot liquid slag according to claim 1, wherein the mold in which the hot liquid slag and the solid metallic particles are poured is integrated in a troughed belt conveyor.

4. The process for granulation of hot liquid slag according to claim 1, wherein the volume of the hot liquid slag in each mold is measured and the quantity of solid metallic particles is adapted to the volume of the hot liquid slag in the mold.

5. The process for granulation of hot liquid slag according to claim 1, wherein the solid metallic particles are dropped into the molds from a height between 1 and 3 m.

6. The process for granulation of hot liquid slag according to claim 1, wherein the solid metallic particles are distributed over the mold by a vibrating chute.

7. The process for granulation of hot liquid slag according to claim 1, wherein the slag cake is broken down to the pieces of slag cake of less than about 150 mm before being discharged in the water bath.

8. The process for granulation of hot liquid slag according to claim 1, wherein the slag cake is dropped from the molds onto a first impact plate situated below the mold and broken down into the pieces of slag cake, said pieces of slag cake are then dropped onto a cold runner and contacted by a water jet and projected against a second impact plate at the end of the cold runner and then dropped in the water bath.

9. The process for granulation of hot liquid slag according to claim 1, wherein the slag cake is dewatered and transferred out of the water bath by a belt conveyor.

10. The process for granulation of hot liquid slag according to claim 9, wherein the solidified, vitrified slag cake mixed with the metallic particles is separated into slag particles and solid metallic particles.

11. The process for granulation of hot liquid slag according to claim 10, wherein the slag particles are separated from the solid metallic particles and the solid metallic particles are recycled.

12. The process for granulation of hot liquid slag according to claim 1, wherein the solid metallic particles are spherical.

13. The process for granulation of hot liquid slag according to claim 1, wherein the solid metallic particles have a diameter of at least 5 mm.

14. The process for granulation of hot liquid slag according to claim 1, wherein the solid metallic particles have a diameter of less than 25 mm.

15. The process for granulation of hot liquid slag according to claim 1, wherein the solid metallic particles are made of a metal chosen amongst the group consisting of iron, steel, copper, chrome, aluminum, their alloys, and their alloys with other metals.

16. A process for granulation of hot liquid slag, comprising:
    casting hot liquid slag into a mold;
    dropping solid metallic particles into the hot liquid slag to mix the particles and the slag and produce a solidified, vitrified slag cake;
    breaking the solidified, vitrified slag cake into a plurality of first pieces of slag cake; and
    discharging the first pieces of slag cake into a water bath.

17. The process for granulation of hot liquid slag according to claim 16, wherein the first pieces of slag cake have a first average size, the process further comprising dropping the first pieces of slag cake onto a first impact plate situated below the mold to fracture the first pieces of slag cake and produce second pieces of slag cake having a second average size that is less than the first average size prior to discharging into the water bath.

18. The process for granulation of hot liquid slag according to claim 17, further comprising dropping the second pieces of slag cake onto a cold runner comprising a water jet to fracture the second pieces of slag cake and produce third pieces of slag cake having a third average size that is less than the second average size prior to discharging into the water bath.

19. The process for granulation of hot liquid slag according to claim 18, the water bath is heated by the second pieces of slag cake to provide heated process water, and wherein the heated process water is used to provide the water jet.

20. The process for granulation of hot liquid slag according to claim 16, further comprising crushing the second pieces of slag cake to liberate the solid metallic particles and produce a plurality of slag particles.

* * * * *